United States Patent [19]

Hisazumi et al.

[11] 4,288,488

[45] * Sep. 8, 1981

[54] LAMINATED PACKING MATERIAL WITH A HIGH GAS-IMPERMEABLILITY AND AN ADVANTAGEOUS WORKABILITY

[75] Inventors: Nobuyuki Hisazumi; Masataka Yamamoto; Tsutomu Uehara, all of Iwaki, Japan

[73] Assignee: Kureha Kagaku Kogyo Kabushiki Kaisha, Tokyo, Japan

[ * ] Notice: The portion of the term of this patent subsequent to Sep. 9, 1997, has been disclaimed.

[21] Appl. No.: 51,193

[22] Filed: Jun. 22, 1979

Related U.S. Application Data

[63] Continuation-in-part of Ser. No. 940,118, Sep. 6, 1978, Pat. No. 4,221,841.

[30] Foreign Application Priority Data

Sep. 13, 1977 [JP]  Japan ................................ 52-109431
Sep. 8, 1978 [DE]  Fed. Rep. of Germany ....... 2839083
Sep. 7, 1978 [NL]  Netherlands ......................... 7909130

[51] Int. Cl.³ .................... B32B 7/02; B32B 27/08; B32B 9/04
[52] U.S. Cl. ................................. 428/214; 428/483; 428/497; 428/518; 428/520; 428/522; 428/911
[58] Field of Search ............. 428/411, 456, 497, 515, 428/518, 520, 522, 911, 214, 483

[56] References Cited

U.S. PATENT DOCUMENTS

| | | | |
|---|---|---|---|
| 195,483 | 9/1897 | Cobb | 428/497 X |
| 1,442,012 | 1/1923 | Sumner | 428/497 X |
| 1,449,748 | 3/1923 | Gardner | 428/497 X |
| 2,968,576 | 1/1961 | Keller et al. | 428/518 X |
| 3,037,868 | 6/1962 | Rosser | 428/518 X |
| 3,325,337 | 6/1967 | Harris | 428/456 X |
| 3,488,211 | 1/1970 | Morrison et al. | 428/518 |
| 3,524,795 | 8/1970 | Peterson | 428/518 X |
| 4,048,428 | 9/1977 | Baird et al. | 428/515 X |
| 4,105,818 | 8/1978 | Scholle | 428/518 X |
| 4,121,006 | 10/1978 | Harada et al. | 428/518 X |
| 4,151,328 | 4/1979 | Kight | 428/518 X |
| 4,186,233 | 1/1980 | Krajewski et al. | 428/518 X |

FOREIGN PATENT DOCUMENTS

729142  3/1966  Canada ............................... 428/518

*Primary Examiner*—P. Ives
*Attorney, Agent, or Firm*—Wegner & Bretschneider

[57] ABSTRACT

A laminated packaging material having high impermeability to gases and high workability is prepared by the lamination of a layer of copolymer of vinylidene chloride containing 3–10% by weight of a plasticizer of a number average molecular weight of less than 500 with another layer of a synthetic resin containing 5–70% by weight of at least one organic additive of a number average molecular weight of about 800–10,000 and selected from the group consisting of glycerides of higher saturated or unsaturated fatty acids and of epoxidized fatty acids, rosin and rosin derivatives, oligomeric copolymers of styrene with isobutylene, butadiene or isoprene, oligomeric polyesters which are formed by polycondensation of aliphatic dicarboxylic acid with 6–10 carbon atoms and polyhydric alcohol with 2–6 carbon atoms and have a number average molecular weight of 1,000–2,000, and oligomeric epoxides formed by polycondensation between epichlorhydrin and bisphenol.

13 Claims, No Drawings

LAMINATED PACKING MATERIAL WITH A HIGH GAS-IMPERMEABLILITY AND AN ADVANTAGEOUS WORKABILITY

CROSS-REFERENCE TO RELATED APPLICATION

The present application is a continuation-in-part of application Serial No. 940,118, filed Sept. 6, 1978, and entitled "LAMINATED MATERIAL", now U.S. Pat. No. 4,221,841.

BACKGROUND OF THE INVENTION

The present invention relates to a laminated packaging material having high impermeability to gases and high workability. More particularly, the present invention relates to a laminated packaging material which is prepared by laminating a layer of copolymer of vinylidene chloride containing a plasticizer of a low molecular weight with another layer of a synthetic resin containing glycerides, rosins, oligomeric copolymers of styrene, oligomeric polyesters and oligomeric epoxy resins with or without having a thin adhesive layer interposed therebetween and by heat-treating the laminated layers to make the plasticizer translocate from the copolymer layer to another layer of the synthetic resin. The thus prepared laminated packaging material is characterized by its high impermeability to gases owing to the presence of extremely small amount of the plasticizer left in its layer of copolymer of vinylidene chloride.

Heretofore, compositions of copolymers of vinylidene chloride made by admixing plasticizers and modifiers with the copolymer were molded alone or laminated with other resins to produce films, sheets and containers, which have been utilized extensively as food-packaging materials owing to their relatively high impermeability to oxygen and water vapour.

However, in cases of packaging foodstuffs which easily deteriorate and therefore should be protected from contact with oxygen, dry foodstuffs and retorted foodstuffs which should be protected from even a slight absorption of moisture, the capability of the above-mentioned packaging materials in serving as a barrier to oxygen and/or water vapour transmission is not satisfactory.

Thus, a need has been felt for the development of new packaging materials capable of offering protection against the permeation of such gaseous substances. One possible way of providing a higher gas-barrier property (impermeability to gases) for this packaging material is to increase the content of vinylidene chloride in the copolymer, however, because the melting point of the copolymer becomes higher with the increase of the content of vinylidene chloride and approximates the degradation point of the copolymer, the packaging material comprising such copolymer of increased content of vinylidene chloride becomes susceptible to thermal degradation and discoloration when it is molded at its processing temperature. In order that the conventional compositions mainly consisting of copolymers of vinylidene chloride may be advantageously molded on a commercial scale by melt extrusion, using ordinary screw-type extruders without entailing thermal degradation or discoloration, it has been definitely necessary that the compositions should contain considerable amounts of modifiers such as a plasticizer and a stabilizer therein. Although these modifiers lower the melting point and improve the thermal stability of the composition, their presence in the processed films or sheets deteriorate the gas-barrier property of the films and sheets in proportion to their content therein. Accordingly, it has been customary to incorporate the modifiers in amounts generally 4–10% by weight of the composition corresponding to particular uses and purposes. The lower limit of the total amount of these modifiers has been held to be 4% by weight for smooth production of molded products, and at the content of 3% by weight the smooth production could not be carried out. At less than 3% by weight, the molding process becomes infeasible.

The present invention, therefore, aims chiefly to eliminate such limits imposed on the gas-impermeability of the products and at the same time satisfy the workability of the compounds in the step of molding and extruding. According to the common knowledge accepted to date, various modifiers and liquid substances should not be added or may be added only in the minimal allowable amount into another layer adjoining the layer of copolymers of vinylidene chloride in order to retain the outstanding gas-impermeability of the layer of copolymers of vinylidene chloride, which is a member layer of laminate materials. Because these modifiers and liquid substances incorporated into the layer adjoining the layer of copolymers of vinylidene chloride migrate into the layer of copolymers of vinylidene chloride they deteriorate the gas-impermeability of the layer of copolymers of vinylidene chloride. For example, when a layer of copolymers of vinylidene chloride is laminated with another layer of ordinary flexible polyvinyl chloride-type resin containing as much as multiples of ten percent of a plasticizer with a low molecular weight, for example, dioctyl phthalete, a large portion of the plasticizer present in the flexible polyvinyl chloride-type resin layer shifts into the copolymer of vinylidene chloride and consequently deteriorates the gas-impermeability of the layer of copolymers of vinylidene chloride.

Thus, the application of such a kind of laminated material has been limited to instances where gas-impermeability is not important or the layer of the copolymers of vinylidene chloride in the laminated material is so thick that the gas-impermeability of the laminated material may be sufficient to pack foods and articles which are very susceptible to oxygen and/or moisture.

Apart from the above-mentioned prevalent common knowledge, the inventors have conceived an idea of using a resin layer containing organic additives, which will be mentioned later, and which possess high affinity to the plasticizer with a low molecular weight used in preparing layers of copolymers of vinylidene chloride. Contrary to the conventional knowledge that such organic additives with high affinity to the plasticizer conventionally used for the copolymer of vinylidene chloride to make a film layer would readily shift from the resin layer, in which they have been introduced by impregnation or blending, to the layer of copolymer of vinylidene chloride when the two layers are brought into contact by their large mobility, thus resulting in the deterioration of the gas-impermeability of the laminated material composed of the layer of copolymer of vinylidene chloride and another layer of a resin containing such organic additives, the inventors have found actually the following phenomenon.

That is, surprisingly, such shift of the organic additives from the resin layer to the layer of copolymers of vinylidene chloride was extremely slight even when they had been incorporated in excess into the resin layer. Moreover, still surprisingly, translocation (shift) plasticizer of the which had been used in the layer of vinylidene chloride took place virtually uni-directionally from the layer of copolymers of vinylidene chloride to the resin layer containing the above-mentioned organic additives.

It has been ascertained by experiments that the above-mentioned uni-directional transfer of the plasticizer from the layer of copolymer of vinylidene chloride has greatly enhanced the gas-impermeability of the so-treated layer of copolymer of vinylidene chloride resulting in enhanced gas-impermeability of the laminate composed of the above-mentioned two layers.

The present invention will be described in detail with reference also to the organic additives above-mentioned.

The present invention has been developed from the above-mentioned phenomenon found by the inventors.

The organic additives which can be effectively contained in at least one layer adjoining the layer of copolymers of vinylidene chloride are those having high affinity to the conventional plasticizer usable in making a resin compound which is processed to the films and sheets of copolymers of vinylidene chloride. The organic additives above-mentioned may be a single compound or a mixture thereof and are selected from the group consisting of glycerides of higher saturated or unsaturated fatty acid, or higher saturated or unsaturated epoxidized fatty acids, rosin and derivatives thereof, oligomeric copolymers of styrene with isobutylene, butadiene or isoprene, oligomeric polyesters formed by polycondensation of an aliphatic dicarboxylic acid with 6 to 10 carbon atoms and a polyhydric alcohol with 2 to 6 carbon atoms and have a number average molecular weight of 1,000 to 2,000 and oligomeric epoxides formed by polycondensation of epichlorhydrin and bisphenol, provided they have a number average molecular weight in the range of 800 to 10,000 and show a melting point of lower than the melting point of the copolymer of vinylidene chloride which is used in preparing film layers. It is impossible to single out a simple and straightforward chemical or physical constant or property in common to the group of compounds above-mentioned, and at present, the above-mentioned lengthy explanation of their combined properties could represent them. For instance, use of a substance with a number average molecular weight of below 800 is undesirable because the substance tends to shift readily into the layer of copolymer of vinylidene chloride to deteriorate the layer's gas-impermeability, and on the other hand, use of an organic additive with a high molecular weight or a high melting point hinders the translocation of the plasticizer from the layer of copolymer of vinylidene chloride. Therefore, it is necessary to use an organic additive having a melting point lower than that of the copolymer of vinylidene chloride.

The most preferable organic additive for use in the above mentioned layer adjoining the layer of copolymer of vinylidene chloride is oligomeric polyesters formed by polycondensation of an aliphatic dicarboxylic acid with 6 to 10 carbon atoms and a polyhydric alcohol with 2 to 6 carbon atoms and have a number average molecular weight of 1,000 to 2,000.

In the present invention, at least one member selected from the group consisting of glycerides, rosin and derivatives thereof, oligomeric polyesters, oligomeric copolymers of styrene, oligomeric epoxides, having a number average molecular weight in the range of 800 to 10,000 is incorporated in an amount of from 5 to 70% by weight in the layer adjoining the layer of copolymer of vinylidene chloride by a step of impregnation or intimate compounding before processing the layer as a film. When the amount is less than 5% by weight, the migration and absorption of the plasticizer which has been present in the layer of copolymer of vinylidene chloride to the layer adjoining layer thereto are insufficient. On the other hand, when the amount is larger than 70% by weight, the strength of the layer, and the strength of the laminate in its turn are less than that required. Thus, any deviation of the amount of the organic additive from the range mentioned above is undesirable.

The layer adjoining the layer of copolymer of vinylidene chloride, which carries the above-mentioned organic additive is desirable when it excels in adhesiveness to the layer of copolymer of vinylidene chloride. Examples of the main constituents which are advantageously used for making the layer carrying the organic additive are: homopolymers of vinyl chloride, chlorinated polyethylenes, chlorinated polyvinyl chlorides, copolymers of vinyl chloride with at least one monomer selected from the group consisting of vinyl acetate, vinylidene chloride, acrylonitrile, ethylene, acrylic esters, methacrylic esters, and alkyl vinyl ethers, homopolymers or copolymers of at least one monomer selected from the group consisting of butadiene, isoprene, styrene, methyl methacrylate and acrylonitrile, copolymers of ethylene with vinyl acetate and partially hydrolized products thereof. Of the various polymers enumerated above, particularly copolymers of vinyl chloride are advantageously used. Use of a flexible type of copolymers and homopolymers of vinyl chloride is advantageous because of the high adhesiveness of the layer made of copolymers and homopolymers of vinyl chloride to the layer of copolymer of vinylidene chloride resulting a desirable effect in the thermal molding of vacuum packages, which will be described later.

The copolymers of vinylidene chloride, which is used in the present invention are processed into a compound comprising 100 parts by weight of a copolymer formed from 60 to 95% by weight of vinylidene chloride and 40 to 5% by weight of a comonomer copolymerizable therewith and 8 to 10 parts by weight of a low weight molecular conventional plasticizer having a molecular weight of lower than 500, and when necessary may additionally contain adjuvants such as stabilizers and colouring agents.

Examples of copolymerizable comonomers usable in copolymers of vinylidene chloride include vinyl chloride, acrylonitrile, acrylic and methacrylic acids, alkylesters of acrylic acid and methacrylic acid containing 1 to 18 carbon atoms in the alkyl group, maleic anhydride, maleic acid, alkyl maleate, itaconic acid, alkyl itaconate, vinyl acetate, ethylene, propylene, isobutylene and butadiene. One monomer or a mixture of two or more monomers selected from the above-mentioned group may be used.

The plasticizer used in processing the copolymer of vinylidene chloride must have a molecular weight of not more than 500 determined by a usual method and desirably have a high diffusion rate in the copolymer. Examples of the plasticizers effectively usable include esters of dibasic aliphatic and aromatic acids such as dioctyl adipate, dioctyl- and dibutyl sebacate, and dioctyl phthalate, hydroxy polycarboxylic esters such as tributyl citrate and tributyl acetylcitrate, glycerol esters such as glycerol tributyrate, epoxides such as octyl epoxystearate and epoxyhexahydrophthalate. One plasticizer or a mixture of two or more plasticizers selected from the foregoing group may be used. The amount of plasticizer is desirable to be not less than 4 parts by weight of the copolymer, because the molding of the compound of copolymer of vinylidene chloride is difficult in the case where the amount of the plasticizer is less than 3 parts by weight. On the other hand, the plasticizer in excess of 10 parts by weight is not only unnecessary but also deleterious because it remains in considerable amount in the layer of copolymer of vinylidene chloride after adjoining with the layer carrying the organic additive to deteriorate the gas-impermeability of the layer of copolymer of vinylidene chloride. Thus, the amount of the plasticizer is limited to the range of from 3 to 10 parts by weight of the copolymer of vinylidene chloride.

The laminate of the present invention consists of at least two layers, one being the afore-mentioned layer of copolymer of the vinylidene chloride and the other being a layer of above-mentioned polymers or copolymers carrying an organic additive joined to at least one of the two surfaces of the former layer of copolymer of vinylidene chloride.

In the case where the laminate of the present invention is left to stand at normal temperature for a long period of time, the plasticizer in the layer of copolymer of vinylidene chloride gradually shifts into the layer containing the organic additive and adjoining the layer of copolymer of vinylidene chloride leaving the layer of copolymer of vinylidene chloride free from the plasticizer resulting in an improved gas-impermeability of the layer of copolymer of vinylidene chloride, and the same effect in the laminate in its turn. Accelerated development of such a high gas-impermeability of the laminate is advantageously obtainable by using the plasticizer in an amount as small as possible for keeping the necessary workability of copolymer of vinylidene chloride, adding the organic additive in an amount as large as possible in the limit and subjecting the finally produced laminate to a heat treatment at the highest temperature at which other properties of the laminate remain unaffected.

Basically, the laminate of the present invention comprises the layer of copolymer of vinylidene chloride containing a plasticizer having a molecular weight of not larger than 500 and the layer adjoining the above-mentioned layer and containing the organic additive afore-mentioned.

It may additionally have another layer such as, for example, a resin layer containing absolutely no additives such as plasticizer, joined to at least one surface of either of the two main layers mentioned above or interposed between the two main layers. When the layer containing absolutely no additive is used as a surface layer of the laminated film which is particularly intended as food packaging material, it offers the advantage that it prevents foodstuffs from coming into direct contact with the layer containing the plasticizer. Moreover, the adhesiveness of this surface layer to another resin sheet can be improved or the workability of the laminated sheet can be freely modified by suitably selecting the resin of which the surface layer is made.

When the layer containing absolutely no additive is interposed between the layer of copolymer of vinylidene chloride and the adjoining layer containing the organic additive, this layer must be as thin as possible in order that it may avoid interfering with the shift of the plasticizer from the layer of copolymer of vinylidene chloride or enhance the adhesion between the two layers. For this purpose, the interposed layer is desirably to have a thickness not exceeding 5 micron.

For instance, a multi-layered laminate composed of (1) a layer of polyvinyl chloride incorporated with one of the organic additives, (2) a layer of copolymer of vinylidene chloride containing a plasticizer and (3) one to four thin layer(s) of a polymer of low melting point selected from the group consisting of low-density polyethylene, copolymer of ethylene and vinyl acetate, copolymer of ethylene and an unsaturated organic acid and ionomer thereof, the thin layer(s) being adjoined to either or both surfaces of layer (1) and/or layer (2) and having the layers adjoining among them, provides an ideal packaging film for vacuum forming under heating in the sense to be described below, because the flexible layer of polyvinyl chloride with an organic additive exhibits conspicuous elastic recovery at temperatures above 60° C., preferably 80° C. The vacuum packaging is started with a packaging procedure which, similarly to the procedure for blister packaging, comprises shape-forming the afore-mentioned laminated film with a metal die to a general shape of the article being wrapped up, inserting the articles in the recesses consequently formed in the laminated film, and joining the base film prepared separately with the planar bottom portion of the shape-formed laminated film. Then the recesses of the film are evacuated and thereafter the spaces between the metal die and the shaped-formed laminate film are changed from the state of vacuum to the state of an atmospheric pressure. Consequently, the change of pressure in the ambience and the power of the shape-formed laminated film manifested in the form of elastic recovery cooperate synergistically, enabling the laminated film to wrap the article tightly without producing any wrinkle. In this case, the deforming stress generated under application of heat is greatly alleviated by the surface layer having a low softening point. Thus, the laminated film substantially functions as a rubbery elastomer. Moreover, since the layer of copolymer of vinylidene chloride is hardly deformed plastically at a normal room temperature and aquires the toughness enough to withstand the residual stress of the rubbery elastomer layer, no appreciable compressive strength is exerted on the article being wrapped up When the laminated film is used for packaging soft materials such as ham and sausage, for example, the laminated film will not compress the content with more pressure than is necessary for tight packaging and consequently crush the material or squeeze the juice out of the material. Neither is there any possibility that the residual strain will cause peeling of the seal along the line of close adhesion between the laminated film and the base film.

The film of such nature can be used, either in conjunction with the base film or all by itself, for vacuum packaging a given article without resort to the shape-forming technique using metal die. Thus, the laminated film of the present invention is a literally epoch-making material for vacuum packaging.

The laminated film of the present invention can also be used for various purposes other than the purpose of vacuum packaging. In the case of the conventional laminated material which comprises a vinyl chloride type resin and a vinylidene chloride type resin, for example, since the plasticizer shifts into the vinylidene chloride type resin as described previously, there is inevitably entailed the disadvantage that the gas-impermeability of the laminated material is deteriorated as a result and the plasticizer itself exudes on to the surface of laminated material and consequently impairs the adhesiveness of the material with the other material. The present invention imparts ample flexibility to the laminated material, notably improves the gas-impermeability of the material, controls the phenomenon of sweating and enhances the adhesiveness of the material with other material, enabling the conventional laminated material to be converted into a highly convenient material usable for bag-in-box packaging, pouch packaging, blister packaging, etc.

By converting the combination which has heretofore been rejected as detrimental into a desirable, advantageous combination as described above, the present invention has proved to be a highly significant and useful achievement for the industry.

The laminated material of the present invention can be manufactured by any of the known methods of lamination such as coextrusion method and lamination method or even by combination of two such known methods.

Now the present invention will be described in detail hereinbelow with reference to the following working examples:

EXAMPLE 1

One hundred parts by weight of a copolymer of vinylidene chloride and vinyl chloride of monomer weight ratio of 80:20 was mixed with 1 part by weight of epoxidized soybean oil as a stabilizer and 8 parts by weight of dibutyl sebacate as a plasticizer. The resultant compound was melt-extruded by an ordinary screwtype extruder and inflation-molded to form film (A) of 50 micron in thickness.

A conventional product of polyvinyl chloride of an average molecular weight of 75,000 and an oligoric polyester prepared by polycondensation of adipic acid and butylene glycol and having acetylated terminal groups with a number average molecular weight of 1,700 were mixed in a weight ratio of 6:4 and the mixture was melt-extruded to form film (B) of 200 micron in thickness.

A laminated material having a construction of (B)/(A)/(B) was produced from the two films of (B) and one film (A) by means of hot rolls.

The permeability to oxygen at 30° C. of the three-ply laminated film was found to be 220 cc/m$^2$.24 hours immediately after the lamination. When the film was given a heat treatment at 80° C. for five hours, the permeability sharply fell to 50 cc/m$^2$.24 hours. In the case of a sample which was left to stand at room temperature for two weeks, the permeability was 35 cc/m$^2$.24 hours. This indicates that the gas-impermeability of the three-ply laminated film was notably improved when the film was left to stand at room temperature and when it was subjected to the accelerated treatment at elevated temperatures. The fact that the improved gas-impermeability was brought about by the shift of the dibutyl sebacate originally present in the layer (A), the layer of copolymer of vinylidene chloride, to the layer (B), the layer of vinyl chloride resin containing the oligomeric polyester was evidenced by the analysis of the layer of vinylidene chloride type resin for dibutyl sebacate content (in % by weight) by use of hexane as an extractant, which gave the values of 7.3, 4.3 and 3.9, respectively immediately after the lamination, after five hours' accelerated treatment and after two weeks' standing at room temperature. The extracts, when developed by paper chromatography, were found to contain no detectable polyester.

REFERENTIAL EXAMPLE 1

The procedure of Example 1 was repeated, except that the oligomeric polyester was substituted by dioctyl adipate as a plasticizer. The permeability to oxygen at 30° C. of the laminated material was 220 cc/m$^2$.24 hours immediately after the lamination. After an accelerated treatment performed at 80° C. for five hours, the permeability rose to 270 cc/m$^2$.24 hours. During two weeks' standing at room temperature, the permeability sharply rose to 560 cc/m$^2$.24 hours. These results clearly indicate that the gas-impermeability of the laminated film was markedly deteriorated by the accelerated heat treatment as well as by the standing at room temperature. The fact that the deterioration of the gas-impermeability was caused by the shift of excess low molecular plasticizer from the carrier resin layer into the layer of copolymer of vinylidene chloride was evidenced by the analysis of the layer of copolymer of vinylidene chloride for its total plasticizer content, which showed an increase of 0.2% by weight after five hours' accelerated heat treatment and an increase of 2.0% by weight after two weeks of standing at room temperature.

REFERENTIAL EXAMPLE 2

The procedure of Example 1 was repeated, except that the addition of oligomeric polyester was completely omitted. The permeability to oxygen at 30° C. of the laminated film was 220 cc/m$^2$.24 hours immediately after the lamination. After five hours' accelerated heat treatment, the permeability was 210 cc/m$^2$.24 hours. Even after two weeks' standing at room temperature, the permeability remained at 210 cc/$^2$.24 hours. Thus, substantially no change was observed in the gas-barrier property of the laminated film.

EXAMPLE 2

Two sheets of a thickness of 1 mm were prepared by using a mixture of 100 parts by weight of a copolymer of vinyl chloride and vinyl acetate (with a vinyl acetate content of 15% by weight) with 50 parts by weight of sunflower-seed oil. Separately, a film having a thickness of 40μ was prepared by using a mixture of 100 parts by weight of a copolymer of vinylidene chloride and vinyl chloride (with a vinylidene chloride content of 35% by weight) with 5 parts by weight of dibutyl sebacate. The two sheets and the one film interposed between the sheets were laminated by the method of Example 1 and then left to stand in an oven at 40° C. to test for the shift of the plasticizer and the oil. The amount of dibutyl sebacate remaining in the copolymer of vinylidene chloride was 3.7% by weight after one day's standing, 2.8% by weight after three days' standing and 2.1% by weight after ten days' standing. The permeability of the laminated film which had been found to be 60 cc/m$^2$.24 hours before the treatment was conspicuously lowered to 22 cc/m$^2$.24 hours after ten days' immersion into sunflower oil. The amount of the sunflower-seed oil translocated into the vinylidene chloride resin film was only 0.6% by weight after ten days' heating.

EXAMPLE 3

One hundred parts by weight of a copolymer formed of 80% by weight of vinylidene chloride and 20% by weight of vinyl chloride, one part by weight of epoxidized soybean oil as a stabilizer and 4 parts by weight of dioctyl adipate as a plasticizer were mixed. The compound thus obtained (C) was mel-extruded to form a film. Three-ply film was prepared by using one layer made of (C) and two layer of (B) described in Example 1, having a construction of (B)/(C)/(B) in thickness of 30/25/30 micron.

A single-layer film of (C) of a thickness of $30\mu$ and a single-layer film of (B) of a thickness of $20\mu$ were separately prepared for the purpose of comparison of permeability to oxygen. These single-layer films were piled up in the same construction as the aforementioned co-extruded three-ply laminated film (B)/(C)/(B). The laminated film and the simple aggregate of single-layer films were tested for permeability to oxygen at 30° C. After three days' standing at room temperature, the permeability was found to be 83 $cc/m^2.24$ hours for the simple aggregate of three-ply films and 50 $cc/m^2.24$ hours for the co-extruded three-ply laminated film, indicating that the present invention improved the gas-impermeability of the film. The co-extruded film of the present invention was found to serve advantageously as a film of excellent gas-impermeability for vacuum packaging under heating.

EXAMPLE 4

The films (B) and (C) of Example 3 and a film (D) of a copolymer of ethylene and vinyl acetate (with a content of vinyl acetate of 15% by weight) possessing good adhesiveness to the layer of copolymer of vinylidene chloride were separately prepared by use of an extruder. By the procedure of Example 2, a three-ply film formed of the films (B)/(C)/(D) of thicknesses of $30\mu/25\mu/30\mu$ was obtained from the films described above. At the same time, a six-ply film formed of the same films each with a halved thickness in the construction of (D)/(C)/(B)/(B)/(C)/(D) was prepared in a form still containing a bubble of blown air.

The permeability to oxygen at 30° C. of the three-ply film and that of the six-ply film and that of the six-ply film were both 63 $cc/m^2.24$ hours after three days' standing at room temperature. Comparison of this value with 83 $cc/m^2.24$ hours, a value found for the simple aggregate of three one-ply films, clearly indicates that the laminated film of the present invention acquired an improved gas-barrier property.

The co-extruded film obtained in this example was found to serve advantageously as a film of excellent gas-impermeability for vacuum packaging.

REFERENTIAL EXAMPLE 3

The procedure of Example 3 was repeated, except that the oligomeric polyester in the film (B) was substituted by 40% by weight of dioctyl adipate. The permeability to oxygen at 30° C. of the laminated film consequently obtained was 260 $cc/m^2.24$ hours after three days' standing. Comparison of the results with those of Example 2 shows that the film of this example had extremely inferior gas-impermeability.

EXAMPLE 5

As component films, the films (B) and (C) involved in the film construction of Example 3, a film (E) of the sodium compound of an ethylene-methacrylic acid copolymer, and a film (F) of a block copolymer of styrene and isoprene (with a styrene content of 14% by weight) as an adhesive for the films (C) and (D) were prepared. A four-ply film was formed of the films (B)/(C)/(F)/(E) of thicknesses of $30\mu/25\mu/5\mu/25\mu$.

The permeability to oxygen at 30° C. of this four-ply film was 60 $cc/m^2.24$ hours after three days' standing at room temperature. Comparison of this value with 83 $cc/m^2.24$ hours, a value found for a simple aggregate of individual component films, indicates that the laminated film of this invention acquired an improved gas-impermeability.

EXAMPLE 6

A laminated film was obtained by following the procedure of Example 1, except that an adhesive layer of thermosetting polyurethane in a thickness of $3\mu$ was applied as the interfacial layer of the component films (A) and (B) involved in Example 1. The permeability to oxygen of the laminated film at 30° C. was 220 $cc/m^2.24$ hours immediately after the lamination. The permeability sharply fell to 55 $cc/m^2.24$ hours after five hours' heat treatment at 80° C. After two weeks' standing at room temperature, the permeability fell to 40 $cc/m^2.24$ hours. The results show that the gas-impermeability of this laminated film was conspicuously improved by the accelerated treatment at elevated temperatures as well as by the prolonged standing at room temperature. The fact that the improved gas-impermeability was brought about by the shift of dibutyl sebacate originally present in the layer (A) into the layer (B) was evidenced by the analysis of the layer (A) for dibutyl sebacate content (in % by weight), which gave the values of 8, 4.6 and 4.1 respectively immediately after the lamination, after five hours' accelerated treatment and after two weeks' standing at room temperature.

What is claimed is:

1. A laminated material having high workability and gas-impermeability, prepared by laminating a layer of a copolymer of vinylidene chloride containing 3 to 10% by weight of a plasticizer having a molecular weight of less than 500 and a carrier layer of a synthetic resin carrying 5 to 70% by weight of at least one organic additive having a number average molecular weight in the range of 800 to 10,000 showing a melting point of lower than that of said copolymer of vinylidene chloride and selected from the group consisting of glycerides of higher saturated or unsaturated fatty acids or of higher saturated or unsaturated epoxidized fatty acids, rosin and derivatives thereof, oligomeric copolymers of styrene with isobutylene, butadiene or isoprene, oligomeric polyesters formed by polycondensation of an aliphatic dicarboxylic acid with 6 to 10 carbon atoms and a polyhydric alcohol with 2 to 6 carbon atoms and have a number average molecular weight of 1,000 to 2,000 and oligomeric epoxides formed by polycondensation of epichlorhydrin and bisphenol.

2. The laminated material of claim 1, wherein the layer of copolymer of vinylidene chloride and the carrier layer have a thin layer of adhesive material interposed therebetween.

3. The laminated material of claim 2, wherein the interposed thin layer of adhesive material is less than 5μ in thickness.

4. The laminated material as set forth in any one of claims 1 to 3, wherein the carrier layer is made of a homopolymer or copolymer of vinyl chloride.

5. The laminated material as set forth in any one of claims 1 to 4, wherein the organic additive has a melting point lower than the melting point of the copolymer of vinyl chloride.

6. The laminated material as set forth in any one of claims 1 to 5, wherein the organic additive is selected from the group consisting of glycerides of higher fatty acids, and rosin and derivatives thereof.

7. The laminated material as set forth in any one of claims 1 to 5, wherein the organic additive is selected from the group consisting of oligomeric polyester, oligomeric epoxy resin and oligomers of styrene and copolymers thereof.

8. The laminated material of claim 7, wherein the organic additive is an oligomeric polyester having a number average molecular weight of from 1,000 to 3,000 and formed between an aliphatic dicarboxylic acid having six to ten carbon atoms and a polyhydric alcohol having from two to six carbon atoms.

9. The laminated material as set forth in any one of claims 1 to 8, wherein the plasticizer in the layer of copolymer of vinylidene chloride is selected from the group consisting of aliphatic dibasic acid esters, phthalic acid esters, hydroxypolycarboxylic acid esters, glycerol esters and epoxides.

10. The laminated material as set forth in any one of claims 1 to 9, wherein the carrier layer contains the organic additive therein in the amount of from 20 to 60% by weight.

11. The laminated material as set forth in any one of claims 1 to 10, wherein the layer of copolymer of vinylidene chloride is made of a copolymer of 60 to 95% by weight of vinylidene chloride and the balance to make up 100% by weight of a monomer copolymerizable with vinylidene chloride.

12. The laminated material of claim 11, wherein the copolymerizable monomer is at least one member selected from the group consisting of vinyl chloride; acrylonitrile; acrylic acid; methacrylic acid; maleic acid; maleic anhydride; alkyl esters of acrylic acid, methacrylic acid, maleic acid and itaconic acid, wherein each of said alkyl groups has one to eighteen carbon atoms; vinyl acetate; ethylene; propylene, isobutylene and butadiene.

13. The laminated material as set forth in any one of claims 1 to 11 and 12 wherein the material is in the form of a packaging film.

* * * * *